(12) United States Patent
de Souza et al.

(10) Patent No.: US 9,715,695 B2
(45) Date of Patent: Jul. 25, 2017

(54) METHOD, SYSTEM AND PROCESSOR-READABLE MEDIA FOR ESTIMATING AIRPORT USAGE DEMAND

(71) Applicant: Xerox Corporation, Norwalk, CT (US)

(72) Inventors: Cesar Roberto de Souza, Grenoble (FR); Luis Rafael Ulloa Paredes, Meylan (FR); Boris Chidlovskii, Meylan (FR); Victor Ciriza, Saint Martin d'Uriage (FR)

(73) Assignee: Conduent Business Services, LLC, Dallas, TX (US)

( * ) Notice: Subject to any disclaimer, the term of this patent is extended or adjusted under 35 U.S.C. 154(b) by 0 days.

(21) Appl. No.: 14/726,887

(22) Filed: Jun. 1, 2015

(65) Prior Publication Data

US 2016/0350770 A1     Dec. 1, 2016

(51) Int. Cl.
  *G06Q 30/02* (2012.01)
  *G06N 7/00* (2006.01)

(52) U.S. Cl.
  CPC ......... *G06Q 30/0202* (2013.01); *G06N 7/005* (2013.01)

(58) Field of Classification Search
  CPC .............................................. G06F 17/30598
  USPC ......................................................... 701/120
  See application file for complete search history.

(56) References Cited

U.S. PATENT DOCUMENTS

| | | | |
|---|---|---|---|
| 6,119,096 A * | 9/2000 | Mann | E05G 5/003 |
| | | | 235/384 |
| 7,533,809 B1 | 5/2009 | Robinson et al. | |
| 7,538,690 B1 | 5/2009 | Kaplan et al. | |
| 7,550,684 B2 * | 6/2009 | Kritzler | G01G 19/58 |
| | | | 177/148 |
| 7,714,742 B1 * | 5/2010 | Noworolski | G08G 1/14 |
| | | | 340/531 |
| 7,739,047 B2 * | 6/2010 | Meunier | G08G 5/0082 |
| | | | 701/120 |
| 7,739,167 B2 | 6/2010 | Breen et al. | |
| 8,452,642 B2 | 5/2013 | Matsuyama | |
| 8,768,867 B1 | 7/2014 | Thaeler et al. | |
| 9,043,329 B1 * | 5/2015 | Patton | G06F 17/3087 |
| | | | 707/740 |
| 2002/0029164 A1 | 3/2002 | Sugar et al. | |
| 2004/0193473 A1 * | 9/2004 | Robertson | G06Q 10/04 |
| | | | 705/7.16 |

(Continued)

OTHER PUBLICATIONS

Gilbo, E. P., "Airport Capacity: Representation, Estimation, Optimization" IEEE Transactions on Control Systems Technology (1993) 1(3):144-154.

(Continued)

*Primary Examiner* — Jean-Paul Cass
(74) *Attorney, Agent, or Firm* — Kermit D. Lopez; Luis M. Ortiz; Ortiz & Lopez, PLLC

(57) ABSTRACT

Methods and systems for estimating airport usage demand. Airport parking traffic usage data and flight-time table data can be compiled with respect to an airport (or more than one airport). The airport parking traffic usage data and flight-time table data can be analyzed using an efficient time matching approach (e.g., a time segment matching algorithm). An efficient method to match passengers and flights is introduced. Passenger behavior can be estimated with respect to the airport based on the airport parking traffic usage data and flight-time table data.

11 Claims, 8 Drawing Sheets

(56) References Cited

U.S. PATENT DOCUMENTS

| | | | |
|---|---|---|---|
| 2005/0182557 A1* | 8/2005 | Smith | G06Q 10/10 701/120 |
| 2005/0280555 A1* | 12/2005 | Warner | G08G 1/14 340/932.2 |
| 2006/0041458 A1* | 2/2006 | Ringrose | G06Q 10/063 705/7.11 |
| 2007/0152850 A1* | 7/2007 | Pechenick | G06Q 30/0249 340/988 |
| 2007/0214033 A1* | 9/2007 | Miller | G06Q 10/04 700/11 |
| 2008/0059273 A1* | 3/2008 | Miller | G06Q 10/04 705/7.31 |
| 2008/0291054 A1* | 11/2008 | Groft | G06Q 30/0284 340/932.2 |
| 2009/0016599 A1* | 1/2009 | Eaton | G06K 9/00335 382/159 |
| 2009/0075624 A1* | 3/2009 | Cox | H04B 1/205 455/345 |
| 2009/0172035 A1* | 7/2009 | Lessing | G06F 17/30595 |
| 2009/0177484 A1* | 7/2009 | Davis | G06Q 30/02 705/346 |
| 2010/0076629 A1* | 3/2010 | Chaix | G01W 1/08 701/14 |
| 2010/0117863 A1* | 5/2010 | Dutt | G06Q 20/127 340/932.2 |
| 2011/0276370 A1* | 11/2011 | Agrait | G07B 15/02 705/13 |
| 2012/0007981 A1* | 1/2012 | Guerrera | B64D 45/0015 348/143 |
| 2012/0221233 A1 | 8/2012 | White et al. | |
| 2013/0024202 A1* | 1/2013 | Harris | G06Q 30/00 705/1.1 |
| 2014/0143251 A1* | 5/2014 | Wang | G06F 17/30598 707/737 |
| 2014/0274154 A1* | 9/2014 | Rana | G06Q 30/0282 455/456.3 |
| 2014/0280180 A1* | 9/2014 | Edecker | G06F 17/30598 707/740 |
| 2014/0309849 A1* | 10/2014 | Ricci | B60Q 1/00 701/33.4 |
| 2015/0045022 A1* | 2/2015 | Prechner | G01S 5/0205 455/434 |
| 2015/0077326 A1* | 3/2015 | Kramer | G06F 3/0325 345/156 |
| 2015/0095073 A1* | 4/2015 | Li | G06Q 50/14 705/6 |
| 2015/0168174 A1* | 6/2015 | Abramson | G01C 21/3697 701/408 |
| 2015/0186497 A1* | 7/2015 | Patton | G06F 17/30598 707/740 |
| 2015/0324373 A1* | 11/2015 | Tyercha | G06F 17/3087 707/722 |
| 2015/0324399 A1* | 11/2015 | Tyercha | G06F 17/30241 707/792 |
| 2016/0039426 A1* | 2/2016 | Ricci | H04W 48/04 701/1 |
| 2016/0063087 A1* | 3/2016 | Berson | G06Q 30/0259 707/740 |
| 2016/0078031 A1* | 3/2016 | Derby | G06F 9/30032 707/747 |
| 2016/0093214 A1* | 3/2016 | Wu | G08G 1/147 348/148 |

OTHER PUBLICATIONS

Gillen, D. et al., "Developing Measures of Airport Productivity and Performance: An Application of Data Envelope Analysis," Transportation Research Part E: Logistics and Transportation Review (1997) 33(4):261-273.

Idris, H. R. et al., "Observations of Departure Processes at Logan Airport to Support the Development of Departure Planning Tools," 2nd USA/Europe Air Traffic Management R&D Seminar Dec. 1-4, 1999, Orlando, 13 pages.

Idrissi, A. et al., "Modeling and Optimization of the Capacity Allocation Problem with Constraints," 2006 International Conference on Research, Innovation and Vision for the Future, Feb. 12-16, pp. 107-116.

Kellner, S., "Airport Capacity Benchmarking by Density Plots," G.A.R.S. Seminar on Airport Benchmarking Nov. 20-21, 2009, Berlin, German Aviation Research Society, 4 pages.

Li, W. et al., "Statistical Analysis of Airport Network of China," Phys. Rev. E (2004) 69(4), 11 pages.

Ma, W. et al., "A Micro-Simulation of Airport Passengers with Advanced Traits," 28th International Congress of the Aeronautical Sciences (2012) Optimage Ltd., Brisbane, Qld, 6 pages.

Ramanujam, V. et al., "Estimation of Arrival-Departure Capacity Tradeoffs in Multi-Airport Systems," Proceedings of the 48th IEEE Conference on Decision Control (2009), 7 pages.

Tu, Y. et al., "Estimating Flight Departure Delay Distributions—A Statistical Approach with Long-term Trend and Short-term Pattern," Journal of the American Statistical Association (2008) 103(481):112-125.

* cited by examiner

METHOD, SYSTEM AND PROCESSOR-READABLE MEDIA FOR ESTIMATING AIRPORT USAGE DEMAND

TECHNICAL FIELD

Embodiments are generally related to techniques and systems for analyzing data associated with airport usage.

BACKGROUND OF THE INVENTION

The presence of an airport in a particular region radically influences which businesses operate in the vicinity of the airport and also how such businesses operate. New services are created to fulfill incoming and outgoing passengers' needs, such as, for example, hotels, stores, car rental companies, transport systems, and car parking.

Discovering how flight traffic and scheduling affect this influx of passengers and thus the demand for a particular service over time is of particular interest for any airport dependent business. In the specific case of a parking business, operating in sync with flight departures and arrivals might enable the best possible use of the parking dependencies by, for example, offering lower prices when there is less demand and higher prices when demand increases.

Current parking lot management solutions offer, to some degree, the ability to predict parking demand over a period of time under predetermined circumstances. However, no system currently exists that leverages airport data to accomplish this task. Furthermore, in a non-cooperative scenario, airport authority's ability to access flight passenger data is limited due to privacy or security issues. Thus, only publicly available (but not necessarily free) data sources may be available to accomplish the task.

In a nutshell, the problem faced here is the following: given historical data about previous parking events inside a parking lot in the vicinity of an airport; and publicly available data for past and scheduled departure and arrival flights, 1) how the influence of a particular flight be estimated with respect to parking demand, and 2) how can (at least partial) assignments of parking events be made available to passengers taking the flight?

Positive answers to these questions may allow one to identify and relate parking records to the flight with a degree of certainty. With such information, parking records may be grouped by flight or by destination while in particular offering an understanding regarding the different characteristics of each destination.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide a method and system for estimating usage demand.

It is another aspect of the disclosed embodiments to provide a method and system for modeling airport usage demand.

It is yet another aspect of the disclosed embodiments to model passenger flow at airports as a mixture of components during a particular period of time, wherein each component is associated with a departure flight.

It is still another aspect of the disclosed embodiments to model this passenger flow with a mixture distribution composed of a collection of other distributions, wherein each component distribution of the mixture distribution is modeled as a distribution in a finite interval.

It is yet another aspect of the disclosed embodiments to provide for a method and system that jointly estimates parameters of the components and their mixture weights, from observed data, namely: parking users, flight schedule information, and aggregated passenger counts.

It is also an aspect of the disclosed embodiments to provide for a method and system for processing the parking events to compute initial scores associated with each flight based on initial distribution estimates (e.g., an initial matching algorithm).

The aforementioned aspects and other objectives and advantages can now be achieved as described herein. Methods and systems are disclosed for estimating airport usage demand. Airport parking traffic usage data and flight-time table data can be compiled with respect to an airport (or more than one airport). The airport parking traffic usage data and flight-time table data can be analyzed and passenger behavior estimated with respect to the airport based on the airport parking traffic usage data and flight-time table data.

In some embodiments, a database of past and future departing and arriving flights from the airport and a database of historical parking data with respect to the airport can be implemented. A model of airport usage demand can then be generated with respect to the airport based on information contained in the database of past and future departing and arriving flights and in the database of historical parking data and a match between the historical parking data and the past and future departing and arriving flights using an average linearithmic time algorithm. The model can be employed to infer how many passengers took a particular flight by analyzing a distribution of parking events with respect to the airport and based on the information contained in the database of past and future departing and arriving flights and the database of historical parking data.

An operation can be provided for estimating for a particular flight with respect to the airport, and based on the model, a percentage of users who likely parked cars in airport parking at the airport and a percentage of users who did not. A match can be developed based on data regarding a flux of passengers within the airport as a mixture distribution, wherein each component of the mixture distribution represents one or more flights with respect to the airport and wherein the flight(s) is either an arrival, a departure, or both. The historical parking data can be derived from an off-street parking lot composed of distinct parking zones with different pricing strategies and physical characteristics, surrounding the airport. Data associated with the match can be employed to create a generative model of parking events that is queried to generate new parking event samples, wherein the model comprises a generative model.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
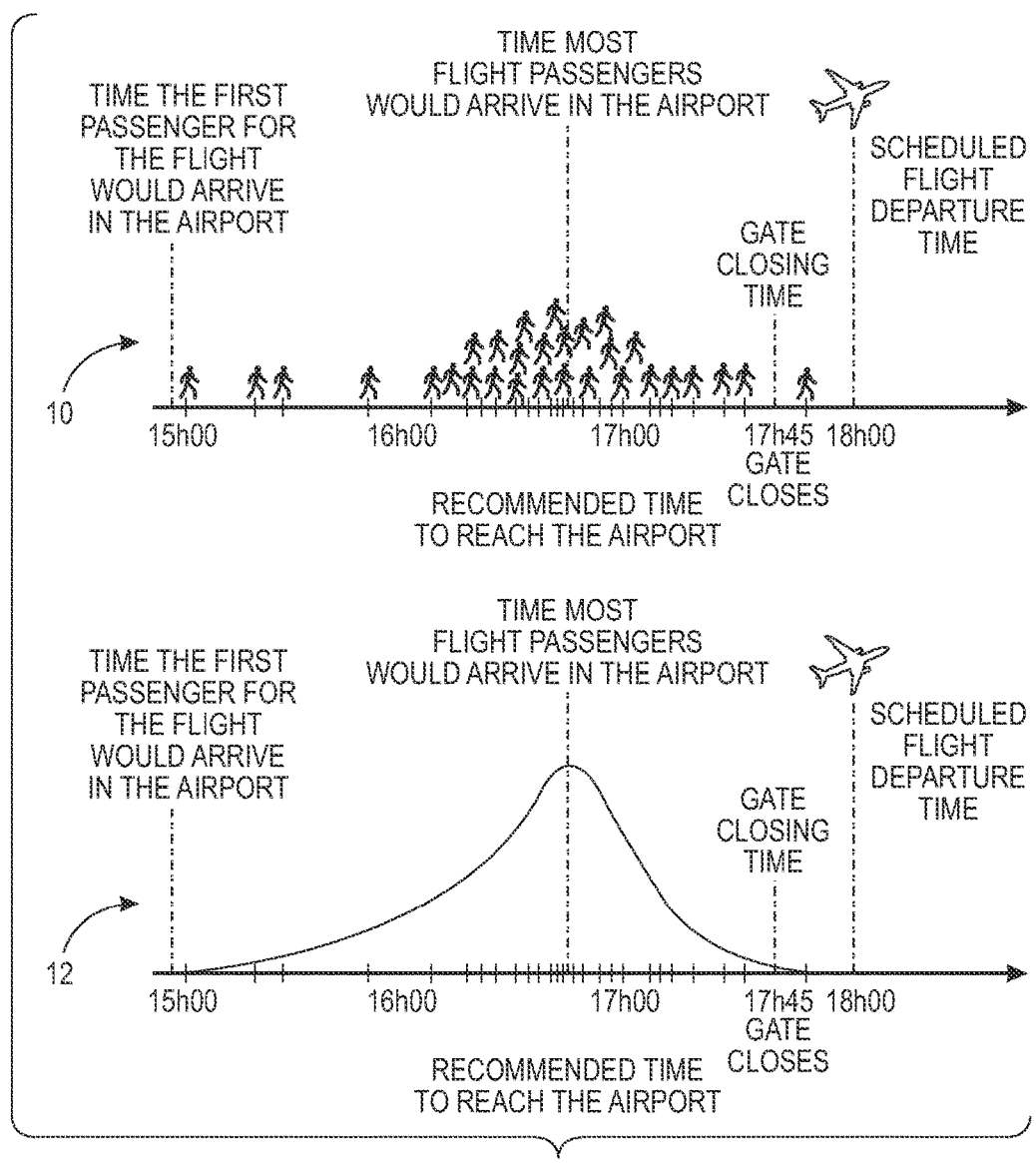
FIG. 1 illustrates an event window with respect to a departing flight and a potential distribution describing a proportion of passengers for a particular plane that arrived at the airport before a time instant t, in accordance with an embodiment.

The particular values and configurations discussed in these non-limiting examples can be varied and are cited merely to illustrate one or more embodiments and are not intended to limit the scope thereof.

The disclosed embodiments can be implemented to use vehicle arrival times, flight schedules, and aggregated passenger counts to model passenger arrival times under a set of generic assumptions. One assumption is that the parking events and corresponding car arrivals to the airport are related to departure or arrival flight. Such time instants can be modelled statistically and related to a particular flight in a probabilistic manner. Then, parking events can be aligned to flights by modelling passengers who park their car and then take the flight. A filtering algorithm can then be employed to separate parking events that are related to flights and thus extract and convert those parking events to passengers.

A finite mixture distribution estimation module (e.g., an algorithm, set of computing instructions, routines, subroutines, etc.) can be employed to fine-tune the arrival and departure distributions associated with each flight. The distributions can be used to determine how likely someone who entered the airport at a given time and left at another given time is to have taken one of the possible flights. In doing so, individual passengers or parking events are not assigned to particular flights. Instead, their relationship is described between or with respect to possible candidate flights in terms of association scores extracted from those distributions.

Afterwards, it can be assumed that the mixture coefficient associated with each departure distribution is used to determine the proportion of the total number of passengers that actually boarded a plane. The main assumption behind this is that, the higher the weight of a particular flight, the more parking activity it was related to, and therefore the more passengers boarded this particular flight.

Note that as utilized herein, the term "mixture distribution" can be thought of as a collection of other distributions. Thus, each component distribution of the mixture distribution can be modeled as a distribution in a finite interval such that in some cases those component distributions may be triangular distributions, or can be something else entirely. It should be appreciated, however, that the disclosed approach is generalizable to any distribution with a finite interval, and is not limited to only triangular distributions. Reference herein to triangular distributions is for illustrative and exemplary purposes only and it can be appreciated that other types of distributions (e.g., non-triangular) can be employed in accordance with the disclosed embodiments.

A number of novel features are thus disclosed herein. First, the passenger flow at an airport can be modeled as a mixture of components during a given period of time, where each component is associated with a departure flight. Each component in the mixture can be modeled as a finite interval distribution and in some cases triangular distributions. An EM-like method can be employed to jointly estimate parameters of the components and their mixture weights, from observed data, namely: parking users, flight schedule information, and aggregated passenger counts. An efficient approach is disclosed for processing the parking events to compute initial scores associated with each flight based on initial distribution estimates (i.e., the initial matching algorithm).

One of the goals of the disclosed embodiments is to create a model that describes and generates new samples of when and for how long people park their vehicles and use the airport services, along with providing an observed variables and an unobserved variables model (or models) and providing an estimation of their values. However, the chief focus of concern relates to data only about vehicles that went to the airport and remained parked at the airport. Note that the set of people who went to the airport using a vehicle and parked this vehicle in the airport parking lot is only a subset of all people that went to the airport.

Because descriptive model is needed, a generative approach can be adopted using probability distributions. Because distributions are used, it should be easy to see that it will be possible to sample from those distributions afterwards, thus generating new samples of the whole population that is sought.

In the disclosed approach, a period of time [0, T] and the following available data can be considered:

Parking Data:

Indices $V=\{1, \ldots, n\}$ of vehicles parked during the considered time period T, where n is the total number of the vehicles;

Vehicle arrival times $VA=\{ta_v\}$, where each $ta_v \in [0, T]$ represents the time of arrival vehicle v in the parking lot, $1 \geq v \geq n$; and Vehicle departure times $VD=\{td_v\}$, where $td_v \in [0,T]$ represents the time when vehicle v leaves (exits) the parking lot, $1 \geq v \geq n$;

Airport Data:

Arrival flights $FA=\{1, \ldots, m_a\}$ period T where $m_a$ is the total number of the flights;

Flight arrival times $AT=\{ta_i\}$, wherein each $ta_i \in \{0,T\}$ represents the flight arrival time i, where $0 \leq i \leq m_a$;

Departure flights $FD=\{1, \ldots, m_d\}$, where $m_d$ is the total number of the flights;

Flight departure times $DT=\{td_j\}$, each $td_j \in [0, T]$ represents the departure flight j time where $0 \leq i \leq m_d$; and Departure flight maximum capacities $C=\{c_j\}$, (in number of passengers), where $0 \leq j \leq m_d$;

Passenger Aggregated Data:

The total number $r_T$ of passengers who departed from the airport during a given period of time $[0, T]$, (e.g., week, month, etc.);

Furthermore, the following variables can be considered, which are not directly observable but are assumed to follow random behaviour:

PA, a random variable such that $P(PA \leq t)$ represents the probability that a passenger arrived in the airport takes a departure flight before time t;

PD, a random variable such that $P(PD \leq t)$ represents the probability that a passenger departed from the airport after disembarking from an arrival flight before time t; and $L_j$, a (discrete) random variable such that $P(L_j=c)$ represents the probability that flight j departed with c passengers, with the upper bound constraint that $P(L_j \geq c_j)=0$.

A model can thus be implemented, which describes and generates new samples of when and for how long people used the services offered by the airport. Given the aforementioned variables, this would mean approximating the distribution of people's arrival times and leave times $P(PA \leq t_a)$. Knowing this distribution would enable us to know the time periods in people are more likely to come to the airport, as well as those passengers would be more likely to leave.

First, we correct the timestamps VA and VD by adding the expected walking time between the parking zones used by the vehicles and the airport, getting the approximate moments in time when those vehicle's passengers came in and out the airport, respectively. Then, we identify a subset of those parking events V that could be matched to any of the possible airplane trips that were feasible to be taken during the same period the car stood parked. Afterwards, we used this reconstructed data as the input for our density estimation process assuming their arrival times would be good representatives of the entire passenger population arrival times.

Assuming the distribution $P(PA \leq t_a)$ of passenger arrival times is directly influenced by the departure times of outgoing flights DT, we approximate $P(PA \leq t_a)$ with an univariate mixture distribution $F(t)$ of time instants t on the form:

$$F(t) = \Sigma_{j=0}^{m_d} \pi_j F_j(t) \quad (1)$$

where $\pi_j$ is the mixture coefficient vector associated with the departure flight j, and $F_j(t)$ is a component distribution associated with the departure flight j. The mixture is constrained to be convex such that:

$$\Sigma_{j=0}^{m_d} \pi_j = 1, \pi_j \geq 0 \quad (2)$$

We consider the case where each component distribution $F_j(t)$ associated with flight j is designed in a way that, at time t, its density function returns the likelihood that a passenger arriving in the airport at this particular instant boarded that particular flight. In this case, $F_j(t)$ must return non-zero probabilities only in the time interval in which flight passengers could have arrived at the airport to take the flight: a few hours before the flight, but no later than the gate closing time.

Under those circumstances, we use the mixture coefficient $\pi_j$ as an importance score for each flight j. The reported total number of departure passengers $r_T$ during period $[0, T]$, must be a fraction of the sum of the individual loads of all departure flights during the period $[0, T]$, i.e.:

$$r_T = \beta \Sigma_{j=0}^{m_d} L_j, \ 0 < \beta < 1 \quad (3)$$

We assume that the importance of each flight could indicate how the total number of passengers for the month is spread among the different flights. In the disclosed embodiments, $\alpha_j = \pi_j r_m$ can be taken as an estimation of the number of passengers $L_j$ boarding each flight.

It should be straightforward for a specialist to estimate the absolute earlier and latest times a passenger might arrive to take a flight in an airport. Any passenger taking a flight is likely to arrive at the airport according to the airport recommendations for national and international flights. In a typical airport, this would mean arriving 1 hour before departure for national flights, and at least 2 hours before departure for international flights. For example, it should be relatively safe to assume no passenger would arrive more than 5 hours before a flight, and no passenger would have arrived after the boarding gate was closed. Thus said, we assume that the time passengers get to the airport are limited by minimum and maximum times, as shown in FIG. 1

FIG. 1 illustrates an event window 10 with respect to a departing flight and a potential distribution 12 describing the proportion of passengers for a particular plane that arrived at the airport before a time instant t, in accordance with an embodiment. Given the limited number of information we have about each departing flight, we describe event windows in terms of a minimum passenger arrival time, an expected passenger arriving time, and a maximum passenger arrival time. Having a maximum, a minimum, and an expected value means our departure time windows would be good candidates to be described through triangular distributions, which although quite simplistic, are extremely popular in simulation systems.

Thus, we approximate the distribution $P_j(T \leq t)$ of arrival times for passengers taking a flight particular j as the integral of a parametric probability density function of the form:

$$F_j(t) = f(t; \theta_j) \quad (4)$$

where $\theta_j$ is a parameter vector associated with the flight j.

As an example, it can be assumed that $f(t; \theta_j)$ denotes a family of triangular distributions parameterized by $\theta_j = \{a_j, b_j, c_j\}$ in which $a_j$ is the minimum instant in time in which a passenger that will take flight j is assumed to enter the airport; $b_j$ is the maximum instant in time in which a passenger could have arrived in the airport and successfully entered the flight; and $c_j$ is the mode, the estimated most common instant in time that passengers boarding that flight will be arriving in the airport. The triangular distribution's probability density function is given by:

$$triang(t; a, b, c) = \begin{cases} 0 & \text{for } t < a \\ \dfrac{2(t-a)}{(b-a)(c-a)} & \text{for } t \leq x < c \\ \dfrac{2}{b-a} & \text{for } x = c \\ \dfrac{2(b-t)}{(b-a)(b-c)} & \text{for } c < x \leq b \\ 0 & \text{for } b < x \end{cases} \quad (5)$$

With the starting (minimum) time $a_j$ and ending (maximum) time $b_j$ being fixed for the triangular distribution $f(t; \theta_j)$, the only parameter to estimate in $\theta_j$ from data is the mode $c_j$. If $S_j$ denotes the set of timestamps $t_{ij}$ associated with the triangular distribution $f(t; \theta_j)$, such that $a_j \le t_{ij} \le b_j$, where each timestamp $t_{ij}$ may have a weight $w_j$, the mode $c_j$ of the triangular distribution can be estimated as follows:

$$c_j \approx \frac{1}{\sum w_j} \sum_{t_{ij} \in S_j}^{m_d} t_{ij} \cdot w_j.$$

Note that althouqh triangular distributions can be employed to exemplify the method described here, nothing prevents the disclosed method from being used with any other distribution that has finite support and that has a location parameter that can place it over any region of the real line. Other distributions that can satisfy such conditions include, for example, Shifted-Log-Logistic, truncated Normal, Generalized Beta, and PERT-Beta distributions. The particular choice for the triangular adopted discussed herein is only an example that makes the problem easier to explain and faster to compute and is not considered a limiting feature of the disclosed embodiments.

For example, the Beta-PERT distribution may be useful to model estimates performed by specialists regarding the minimum, maximum, and more likely values for a considered variable (e.g., see FIG. 1). Its main drawback is higher computational time. In the following, triangular distributions are used for their simplicity and fast evaluation.

Figure 2:
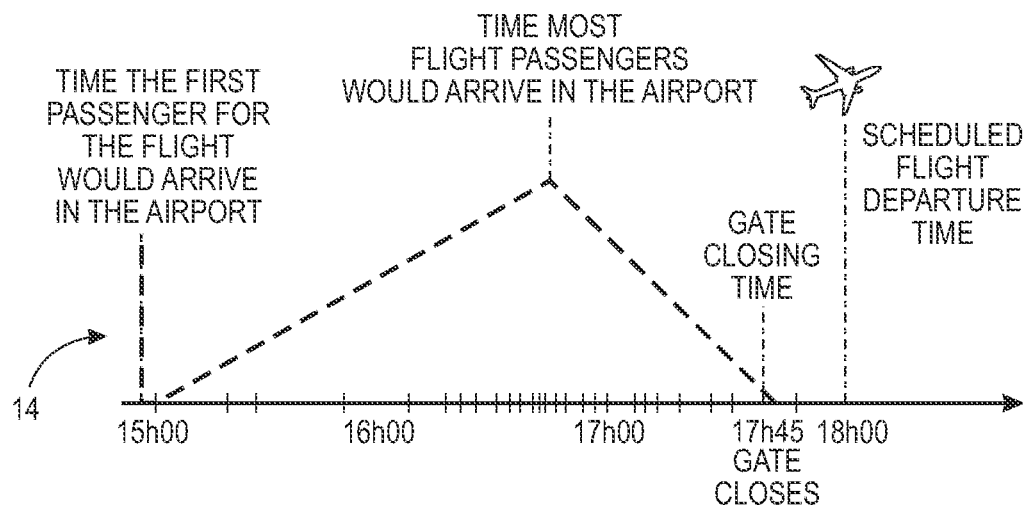
FIG. 2 illustrates a graph of the modeling of a proportion of passengers that arrived at the airport to board a given plane before time t using a triangular distribution, in accordance with an example embodiment.
Figure 3:
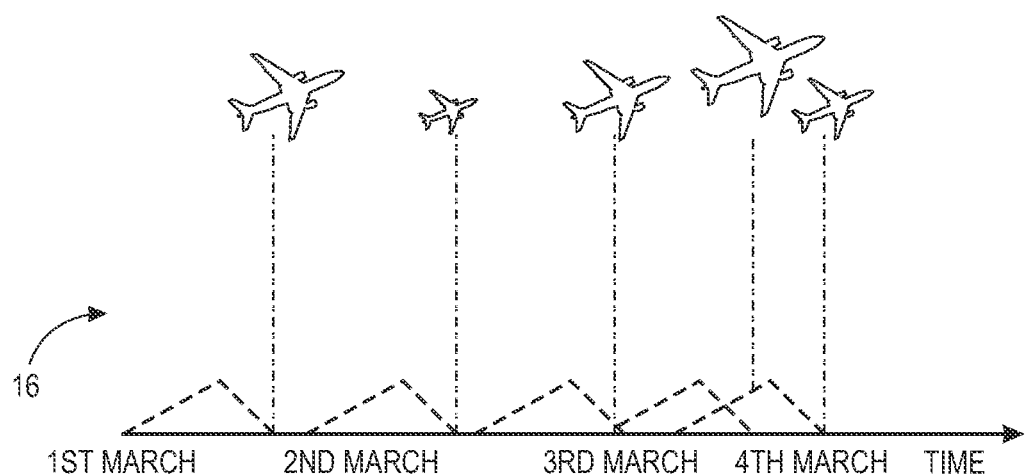
FIG. 3 illustrates a graph of the modeling of a proportion of passengers that arrived at the airport to board any plane before time t using overlapping triangular distributions, in accordance with an example embodiment.

After all those considerations, the proportion of passengers that go to the airport to board a plane j before a time instant t can be described with a distribution, an example of which is shown in FIG. 2. FIG. 2 illustrates a graph 14 of the modeling of a proportion of passengers that arrived at the airport to board a given plane before time t using a triangular distribution, in accordance with an example embodiment. FIG. 3 then shows a graph that indicates what happens when all the flights are put together during a period of several days. That is, FIG. 3 illustrates a graph 16 of the modeling of a proportion of passengers that arrived at the airport to board any plane before time using overlapping triangular distributions, in accordance with an example embodiment.

Figure 4:
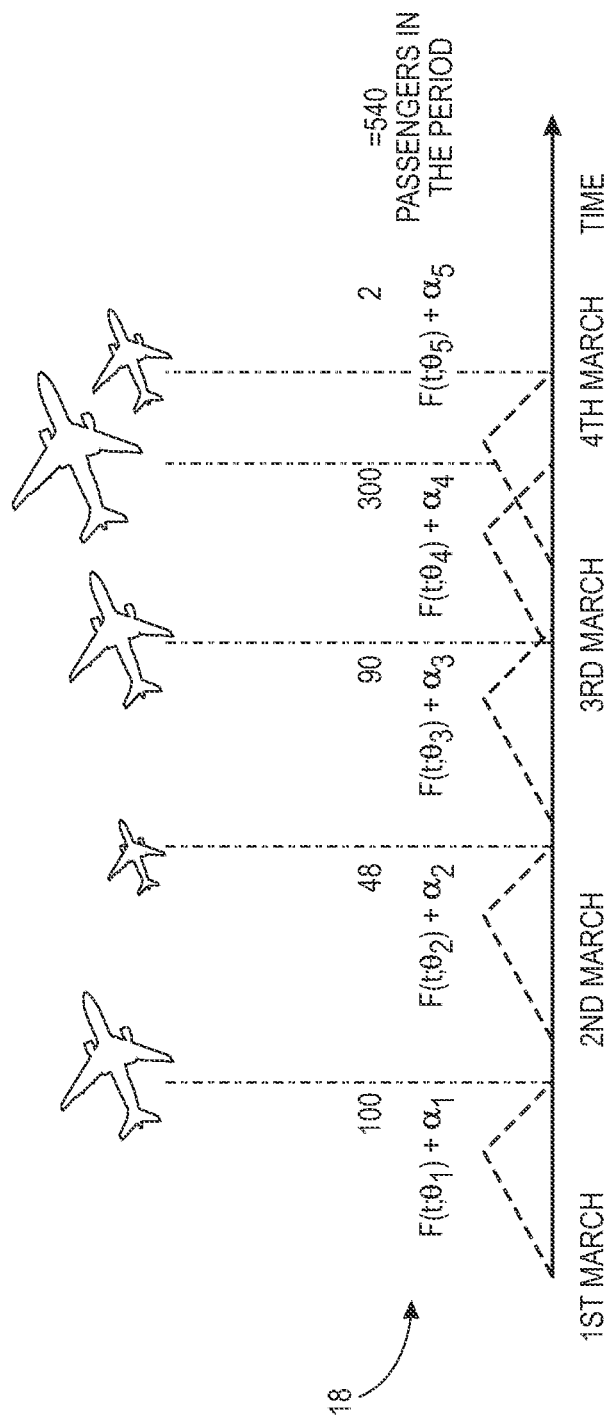
FIG. 4 illustrates a graph indicating if the number of passengers in a period are known, this number can be trivially expressed as the summation of the unknown number of passengers that boarded each plane, in accordance with an example embodiment.

FIG. 4 illustrates a graph 18 indicating if the number of passengers in a period are known, this number can be expressed as the summation of the unknown number of passengers that boarded each plane, in accordance with an example embodiment. In FIG. 4, each distribution $F(t;\theta_j)$ gives the proportion of passengers for flight j that got to the airport until time t. If we denote by $a_j$ the number of passengers that each flight took, accumulating $F(t;\theta_j)$ times the number of passengers $a_j$ would give the total number of passengers who departed from the airport during the considered period:

$$\text{Passengers}(t) = \sum_{j=1}^{m_d} F(t;\theta_j) \cdot \alpha_j. \quad (6)$$

As all distributions are defined in finite intervals, at the end of the period [0,T] every distribution $F(t;\theta_j)$ will necessarily evaluate to 1 for every flight j. This means that, at the end of the period, equation (4) will become:

$$r_T = \sum_{j=1}^{m_d} \alpha_j \quad (7)$$

where $r_T$ is the total number of passengers during the considered period. Now, if the variable substitution $\pi_j = \alpha_j/r_T$ is applied, then from equations (6) and (7) the following formulation can be obtained:

$$\text{Passengers}(t) = \left( \sum_{j=1}^{m_d} \frac{\pi_j}{r_T} F(t;\theta_j) \right) \quad (8)$$

This mixture distribution gives the proportion of passengers that entered the airport up to an instant in time t. If we could estimate this distribution appropriately, it should be possible to get a rough estimate on the proportion of passengers boarding each flight.

The problem is that we don't have data about passengers that entered the airport, but we have data about some passengers who did. The fact is that we have access to the parking data, and within this data, we know that some observations indeed correspond to passengers who parked their cars in the airport parking lot. So if we could extract passengers from the parking data, we would be able to estimate information about passengers by processing the parking data instead.

In this section, we will detail how to perform the initial matching between parking users and potential flight passengers in linearithmic average time complexity, i.e., $\Theta(n \log n)$, using one of the algorithms covered in this disclosure. In order to justify such algorithm, we can enumerate the different dimensions involved in the matching problem. In our setting, we provide the following:

n, the number of parking users t, the number of travelers $m_a$, the number of arriving flights $m_d$, the number of departing flights The naïve solution for finding the best matching departure and arrival flight for a specific users would involve, for each user, check which pair of departure and arrival flights is closer. This would, thus, be a $O(n \, m_a \, m_d)$ time complexity operation. Now, while either $m_a$ and $m_d$ alone would typically be a number much smaller than the number of parking users n, it turns out that $m_a \, m_d$ is vastly bigger than n.

An efficient algorithm is described to address this problem with $O(n \log n + m_a + m_d + m_a \, m_d)$ complexity in the average case. The algorithm can be used to make initial flight coefficient estimates that will be used to fit the mixture model described on the top of this section. Moreover, it is shown, with an actual implementation, that we will be able to both perform this matching and estimate the number of passengers per flight of, for example, the Toulouse-Blagnac Airport in seconds, for any given month that we have available in our records.

The objective of this algorithm is to identify the set of likely departure flights and arrival flights a parking user could have taken. Parking events which could not be associated with flights are separated in a different set of users that could be matched to potential drop-offs and pick-ups, or other airport activities. This is a soft matching algorithm because no assignments are made; instead, a relationship score s is found between each parking vehicle $\upsilon \in V$ and a departure flight $j \in FD$.

At the end, the algorithm finds a mapping $S: V \to \Psi$ between each vehicle $\upsilon \in V$ that parked in the airport's parking lot and a set $\psi \in \Psi$ of tuples (j, s) containing a potential departure flight $j \in FD$) and an association score $s \in \mathbb{R}$ measuring the degree of association between vehicle v and the departure flight j. A sample algorithm is provided below.

Algorithm. Parking-Passenger Matching with Probabilistic Assignments

1. Register every possible destination and every connecting airport between our local airport and the airports of all possible destinations. This involves one pass over all related flights, registering each airport in an airport dictionary.
   P←get_airports( )
2. Register every departing flight. A departing flight is a flight that comes from our local airport to another airport. Every outgoing flight has a boarding time window that is defined initially as a triangular distribution of minutes since the relative dawn of time.
   D←get_departing_flights( )
3. Register every arriving flight. An arriving flight is a flight that comes from an external airport to our local airport. The source airport will be part of one of our previously registered destinations. Every incoming flight has a disembarking time window that is defined initially as a triangular distribution of minutes since the relative dawn of time.
   A←get_arriving_flights( )
4. Extract all possible round trips that can be made starting from our local airport. A round trip is defined as a tuple of a departure flight to a particular airport, and a returning flight in the future returning from this same airport. Only possible return flights are considered, i.e. a traveller can't come back into his departure airport before there was enough time for his plane to actually arrive on the destination airport and then come back. Trips are stored as a hash set, so every trip localization can be made in O(1) time for any pair of flights. Note that this is a $O(m_d m_a)$ operation.
   R←get_valid_roundtrips(D, A)
5. Extract information about every previously collected parking event. A parking event is defined as arrival date, a departure date, and a chosen parking zone inside which the user parked his car.
   U←get_parking_events( )
Find likely departing flights for each user. In order to accomplish this step, we will first perform a problem transformation that will make us able to transform this operation from time complexity $O(n\ m_a)$ into $O(n \log n + 2m_a)$.
5.1. For each departure flight, we will create two points in time: one for the beginning of the flights boarding window, and one for its end. We will then store those points in a vector of flight events, and sort them by date.

```
E ← { }    /* flight events */
for each departure flight f_d in D
    E ← E ∪ { f_d, window_start(f_d), 'departure window start' }
    E ← E ∪ { f_d, window_end(f_d), 'departure window close' }
end-foreach
sort(E, 'asc')   /* sort flight events by their date */
```

5.2. Now, we will iterate over both the list of users and our list of airport events in a mergesort-like fashion.

```
user ← first(U)
event ← first(E)
candidates ← { }   /* bag of possible departing flights */
let W_d be a set of (user, flight) pairs storing the possible departures a user
could have taken
while (event ∈ E)
    flight ← get_flight_associated_with(event)
    if airport_entry_time(user) ≤ time(event)
        Current user event happened before the next flight event: We simply
        copy the bag of departures to the user, with each flight likelihood.
        for each flight in candidates
            θ ← get_triang_parameters_associated_with_flight(flight)
            W_d [user][flight] ← triang_pdf (airport_entry_time(user); θ)
        end-foreach
        user ← next(U, user);
    else
        Current flight event happened before the next user
        event: We update the bag of departure flights
        if event_type(event) = 'departure window start'
            A new boarding window has started; add flight to candidates bag.
            candidates ← candidates ∪ { flight }
        else
            A previous boarding window has ended; remove flight from bag.
            candidates ← candidates - { flight }
        end-if
    end-if
    event ← next(E, event);
end-while
```

6. We do an analogous algorithm for the arrival flights; however, instead of considering the boarding windows, we consider expected flight leave windows. The user-flight score estimates are still computed in the same way by considering the expected arrival distribution time window and are stored in a set $W_a$. Analogously as in step 6, this step has complexity $O(n \log+2m_a)$.

7. At this point, every user has a distinct set of possible candidate departure flights the user could have took, and a distinct set of possible candidate arrival flights he could have left from. Please note that each user's set contains a much smaller subset of the original possible departure and arrival sets. Now, we can iterate every user and check if we can find matching trips amongst their set of candidate departure and arrival flights. Because the size of each set will be constrained by the amount of simultaneously overlapping boarding windows allowed by the airport, the size of those bags can be considered fixed (in our context, around only 12 flights per user can be found in average, in each set—thus, we effectively reduced the burden of inspecting ~7 million flight combinations for each user into approximately ~144 trips per user).

```
let L be a set of (user, trip) pairs storing a likelihood score of each
trip for each user
for each user in U
    d ← W_d[user] /* vector of possible flight departures per user
    found in step 6 */
    a ← W_a[user] /* vector of possible flight arrivals per user found
    in step 7 */
    n ← size(d) /* number of possible departure flights identified
    for the user */
    m ← size(a) /* number of possible arrival flights identified
    for the user /*
    for i from 0 to n
        for j from 0 to m
            if ( { d_i, a_j } ∈ R) /* check if the trip R_{d_i,a_j} formed
            by d_i and a_j is possible */
                /* we chose to compute the score of the trip as the score
                of boarding the departure flight times the score of
                disembarking from the arrival flight, in which the
                score of the flights are determined by the likelihood
                response of the distributions associated with each
                flight. */
                /* below, α and β are the scores normalized to be
                between 0 and 1. */
```

-continued $$\alpha \leftarrow \frac{W_d[\text{user}, d_j]}{\sum_{k=0}^{n} W_d[\text{user}, d_k]}$$

$$\beta \leftarrow \frac{W_a[\text{user}, a_j]}{\sum_{k=0}^{m} W_a[\text{user}, a_k]}$$

L[user] [$R_{d_j a_j}$] ← α β
    end-if
   end-for
  end-for
end-foreach

8. At this point, every user has a list of possible taken trips, each of those roundtrips associated with a given likelihood score denoted as L[user] [$R_{d,a}$]. The next step is now compute a likelihood of taking a departing flight under the assumption that this user really took any of the possible trips at the first place. It means that, at this time and under this assumption, we can separate parking users in either passengers and non-passengers by taking whether the previous step was able to associate a parking user with any of the possible round trips that was higher than some tolerance threshold d.

Passengers←{userϵU|∃rϵR: L[user][$R_{d_i a_j}$]>d}

9. Finally, assuming the users indeed took at least one of the matched trips, we compute a likelihood for a passenger taking a departure flight $f_d$ summing the likelihoods of all trips involving $f_d$ and normalizing those quantities to form probabilities.

```
let S be a set of user-departure flight pairs storing a likelihood
    score of each departing flight for each passenger.
for each user in Passengers
    for each trip R_{d,a} in L[user] /* possible trips the user could
    have taken */
        /* accumulate the scores of all trips sharing the same
        departure flight */
        S[user][d] ← S[user][d] + r[user][R_{d,a}]
    end-foreach
    /* normalize the scores so the scores of all possible
    departure flights for a particular user sum up to one */
    sum ← 0
    for each departure d in S[user]
        sum ← S[user][d]
    end-foreach
    for each departure d in S[user]
        S[user][d] ← S[user][d] / sum
    end-foreach
end-foreach
return S, a map relating a user to a list of candidate flights the user
could have taken, as well as normalized scores representing the
strength of the association found between the user and each
particular flight.
```

A filtering algorithm can be used to initialize expectation-maximization. The matching algorithm in the previous section outputs a map associating each parking user with a subset of departing flights that this user could have taken, together with an association score ranging from 0 to 1.

The obtained scores can be used to initialize the mixture coefficients $\pi_j$ associated with each departure flight j in the mixture model. Note, however, that this initialization is not strictly necessary but highly recommended, as running a simple E-M algorithm without using smart weight initialization can converge to a local minimum and thus produce a poor solution. It can be appreciated that simply using the scores alone already leads to interesting results, and subsequent runs of the E-M algorithm improve upon them.

As such, the mixture coefficients $\pi_j$ can be initialised with values $\hat{\pi}_j$ given as $$\hat{\pi}_j \propto \Sigma_{\text{user} \in P(d_j)} S[\text{user}][d_j] \qquad (9)$$

where $P(d_j)$ is the subset of all parking users that could be matched to the departure flight $d_j$ with an association score s higher than some tolerance threshold ϵ>0. Afterwards, E-M can be used to estimate the mixture distribution of passenger arrival times PA in the same way anyone would use it to fit a mixture of Gaussians (or any other equivalent mixture):

$$f(t) = \Sigma_{j=1}^{m_d} f(t; \theta_j) \cdot \pi_j \qquad (10)$$

The only difference is that we are holding the triangular distribution parameters $a_j$ and $b_j$ to be fixed, and we are feeding it with the timestamps of the subset of parked vehicles V that could have been associated with at least one of the flights from FD through the mapping S identified above.

For completeness, we will present the expectation and maximization steps of the E-M algorithm for distribution mixtures, although this is just the standard algorithm with no modifications.

Algorithm. EM for a mixture distribution of passenger arrival times where each component in the mixture represents a departure flight.

Input: A set of n timestamps $t_i \in T$ and a set of $m_d$ departure flights j ∈ FD, each of which having an associated distribution parameter vector $\theta_j$ detailed in section 3.1.

1. Initialization. Initialize the parameter vectors associated with each flight $\theta_j$ (such as using equation (5)), the mixing coefficients indicating the association score of each flight $\pi_j$ (such as using equation 9)
2. Expectations. Evaluate the participation of parking user i in the component j at the current iteration;

$$w_{ij} = \frac{\pi_j f(t_i; \theta_j)}{\sum_{k=1}^{m_d} \pi_k f(t_i; \theta_k)}$$

3. Maximization. Re-estimate the parameters of the individual component distributions associated with each flight using the responsibilities.
   In case $f(t; \theta_j)$ is being modelled as a triangular distribution with a single free parameter $c_j$ that refers to the mode of the expected passenger show up times (equation 5), the parameter vector associated with each flight would be $\theta_j = \{c_j\}$. A possible way to approximate $c_j$ and solve for $c_j$ to match the sample mean extracted from the current weighted samples, giving $$c_j = \frac{1}{\sum w_{ij}} \sum_{t_{ij} \in S_j}^{m_d} t_{ij} \cdot w_{ij}.$$

Moreover, we also give the maximum likelihood equations for Beta distributions. Beta Distributions are interesting because it is possible to initialize them using the same three-point estimation that we used for the Triangular using PERT (Vose, 2008). For Beta distributions with parameters $\alpha_j$, $\beta_j$, the weighted MLE equations that can be used in the Maximization step can be obtained by maximizing the complete log-likelihood function $$\ln\mathcal{L}(\alpha_j, \beta_j) = (\alpha - 1)\sum_{i=1}^{n} w_{ij}\ln(t_i) + (\beta - 1)\sum_{i=1}^{n} w_{ij}\ln(1 - t_i) - n\ln B(\alpha, \beta)$$

Two techniques can be used to validate our results and compare how well our technique performs. All experiments performed here will be performed in the context of the Biagnac-Toulouse airport, which fortunately enough uses appropriate technologies to administer and manage its parking zones. Thankfully, this airport also publishes monthly traffic reports which we can use to validate our models, making sure our predicted results align with the reality.

However, in order to complement our qualitative findings with quantitative performance comparisons, we created an airport traffic simulator which is able to, given the setup of some parameters, generate entirely new sets of parking data, passenger data, and flight operations. We have set up those simulations so they could create different variations of the original airport: such as decrease and increase in demand, different rates under which people might park their car and become travelers, different rates under which people may simply use the airport for non-travel related reasons, and so on.

Given those simulations, we will then use our estimation technique to approximate the behavior of those virtual airports. And since we have access to the ground-truth data that generated the observed events for those airports, we would then be able to check which kinds of behavior the estimation method described herein would be already able to account for.

The simulations used to create our syntactic data start from the principle that people need to use an airport and have to go there on some way. From this point of view, we consider the existence of several probability distributions that govern the way people will be arriving in the airport: either by parking their cars, not parking, taking a ride, asking someone to drop them off or to pick them up. We also consider that the reason people would need to use an airport was not confined to the strict need of taking a flight or giving a ride to someone who is taking a flight. We also consider situations where whoever needs to go to the airport is not taking a flight, but instead is going to work in the airport, for example, or do shopping in the airport's stores. Thus the simulation system also generates unrelated parking events which are not related to any flights when creating the synthetic data.

Six different estimation strategies were tested to determine how such strategies fared in estimating the airplane load as well as the expected number of passengers per destination. Since the simulations were able to vary freely between themselves, we could also determine how our error changes when airport behaviors changes. From the six evaluated strategies, the first four of them could have been considered null models. Those are:

Assume that all flights are at full capacity, which is self-explicative and which also assumes we got the flight capacity right;

Linearly-scaled down capacity, where we take the full capacity of the flights, but linearly reduce it so the total number of passengers per month matches the total number of passengers "published" by the virtual airport (mimicking the way Toulouse publishes their reports);

Number of parking events, which assumes the number of passengers in the flight is proportional to the number of parking events that happened during the flight window;

Number of travelers, which assumes the number of passengers in the flight is proportional to the number of parking events that could have been matched to flight passengers;

Weighted number of travelers, that is the approach described in this invention disclosure to approximate the flight mixture coefficients, without jointly learning any parameter of the passenger distributions associated with each flight; and Expectation maximization, that is the same approach described above, but letting EM learn the flight mixture coefficients together with the parameters for the probability distributions associated with each departure flight at the same time.

The results we obtained, as well as their standard error bars, are shown in the next page. We can see that the last two strategies (the ones described in this disclosure) present the best error rates among all alternative models considered. We can see how our method operates much better than just taking capacity or number of parking events as predictors for passenger load.

One interesting observation is that they are not that far from just scaling the plane capacity down so the total number of passengers published by the airport. However, we can clearly see how the approach described here presents a much better standard error deviation in those cases.

This is understandable, because simply scaling down the airplane capacity as the true number of passengers doesn't necessarily reflect the distinct airplane loads that could be used for different destinations, and the difference in load for distinct times of the day that could have been taken in account by finding a relationship between the load and the parking events. Moreover, this approach can also handle cargo planes, i.e., planes that departed from the airport, but that didn't take any passengers with them.

Figure 5:
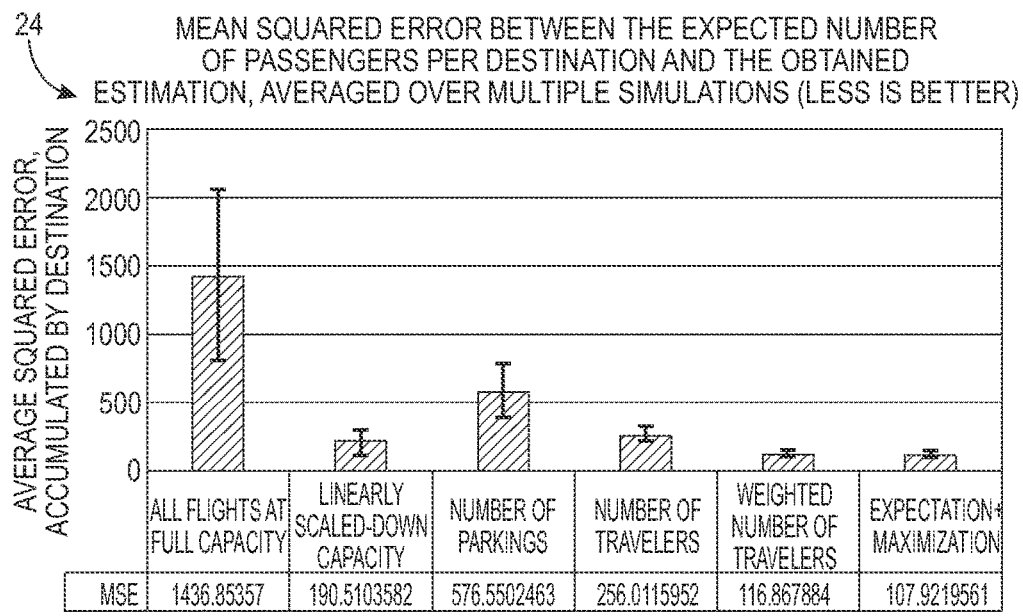
FIG. 5 depicts graphs indicating performance measures between different techniques for estimating the relationship between parking events and flight passengers, in accordance with an example embodiment.
Figure 5:
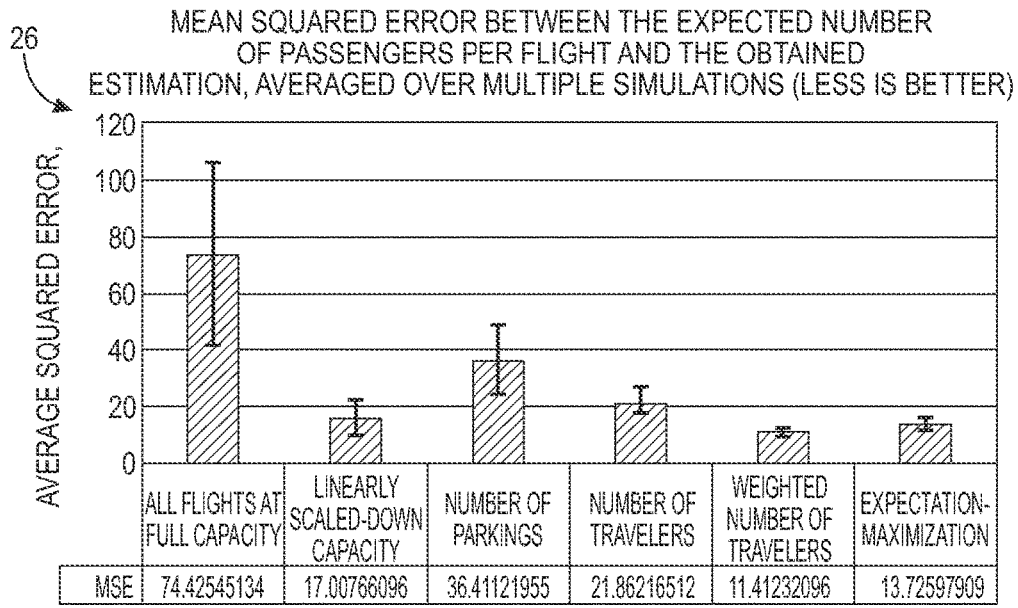

FIG. 5 illustrates graphs 24 and 26 indicating performance measures between different techniques for estimating the relationship between parking events and flight passengers, in accordance with an example embodiment. The approach described herein with respect to the disclosed embodiments are based on the "weighted number of travelers" and "expectation-maximization" methods. Graph 24, for example, indicates data indicative of the mean squared error between the expected number of passengers per destination and the obtained estimation, averaged over multiple simulations (i.e., less is better). On the other hand, graph 26 depicts the mean squared error between the expected number of passengers per flight and the obtained destination, averaged over multiple simulations (i.e., also, less is better).

Figure 6:
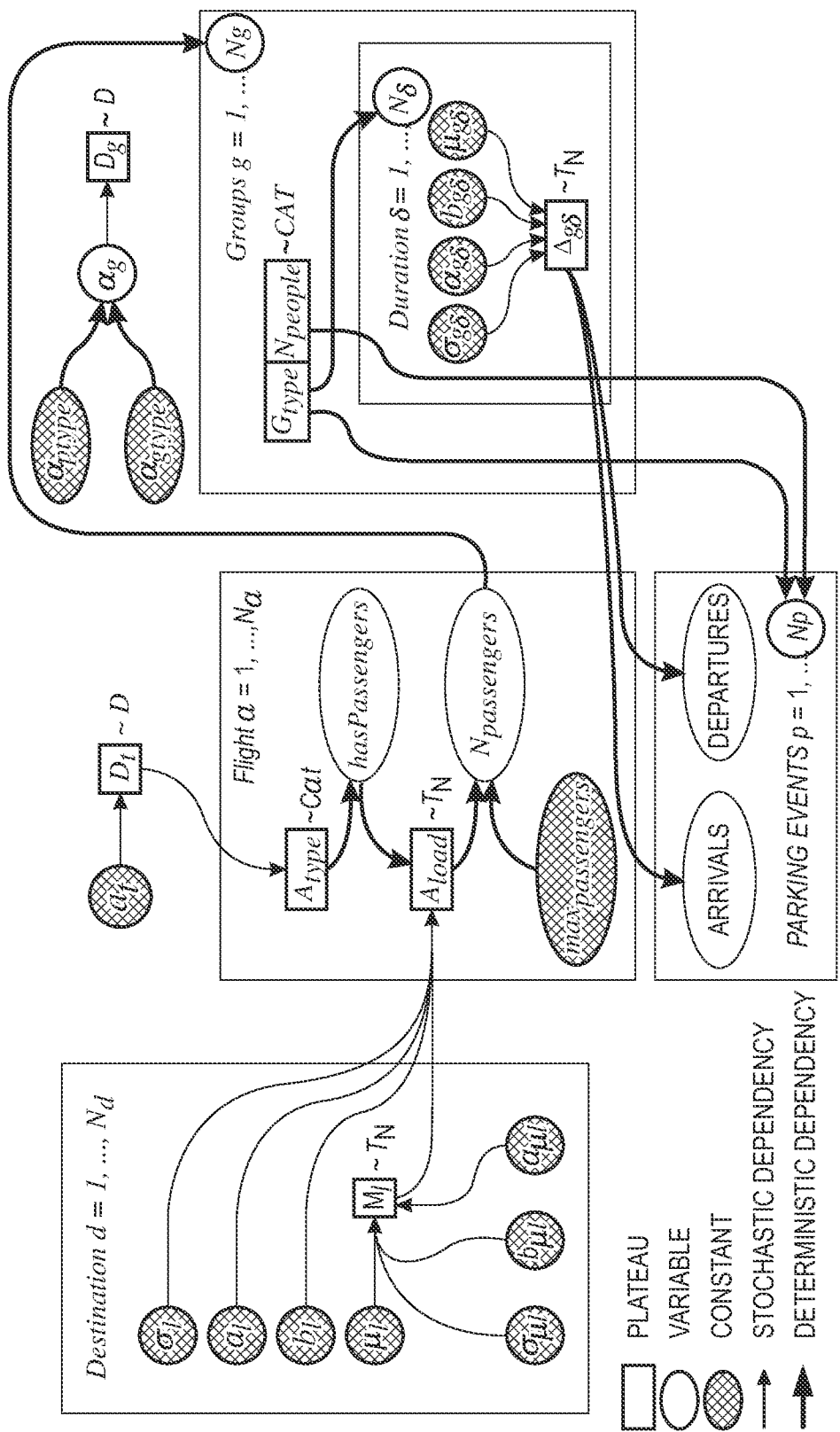
FIG. 6 illustrates a probabilistic graphical model used for generating airport parking events, in accordance with an alternative embodiment.

FIG. 6 illustrates a probabilistic graphical model used for generating airport parking events, in accordance with an alternative embodiment. Such an approach is not intended to perfectly mimic reality. Rather, it provides us an understanding on what kind of rules the disclosed estimation method proposed is capable of covering. In order to test those behaviors, a varying number of simulated airports can be created in a macro-level, following commonplace rules for airport usage.

In other words, the simulator generates synthetic data by following a few number of rules, and then the algorithm presented previously can be applied to over this synthetic data to check if we can at least model the few rules incorporated into the simulator. While not optimal, this provides one quantitative way to assert which kind of behaviors our algorithm is already able to cover—and more importantly, on how it could be improved.

Those simulations start from the principle that people need to use an airport and have to go there on some way. From this point, several distributions govern the way people will be arriving at the airport; either by parking their cars, not parking, taking a ride, asking someone to drop them off or to pick them up. We also note that the need to use an airport was not confined to the need to take a flight the system can also generate unrelated parking events which are not related to any flights.

Thus said, the simulation hereby is made by sampling varies over different distributions. Those distributions, and the way they are interconnected, can be seen in the example probabilistic graphical model shown in FIG. 6. Each plateau in the model represents a set of entities characterized by constants and generated variables. Those variables, in turn, are either sampled (if they have a stochastic dependency) or directly computed (if they are defined through a deterministic logical relation).

The aforementioned stochastic dependencies can be modeled using probabilistic distributions. Such distributions can include, for example: categoricals, used to sample different categories of the simulated entities, such as flight types (i.e., a cargo flight, a passenger flight), and usage event type (such as whether the parking event was generated for a single person parking, a couple dropping off someone, a couple with one kid parking, and so on). The categorical distributions reflect the frequency at which each of those categories would happen in the data. Such distributions can also include Dirichlets, used as the conjugate prior for categorical distributions described above. Dirichlet densities can model how much belief we should put on each probability of occurrence for distinct categories in a categorical distribution. For K categories, it is able to give the belief that the probability value of each category i will indeed be $x_i$ having been observed $\alpha_i$-1 times. Such distributions can additionally include Truncated Normals, used as the conjugate prior of itself. The truncated normal can return the probability normally distributed variable bounded on a specific interval. As such, it can be used to sample bounded durations (such as, for example, the airplane load and the average airplane load per destination).

Here, the main entities of the simulation graphical model are the flights. Those flights have known departure date times and their maximum capacity is known. We know, however, that flights are seldom at full capacity unless they go to certain, specific destinations. The simulation starts by sampling the type of the airplane that is going to lift-off. Those types could either describe a cargo plane or a passenger flight. If the latter is selected, a passenger load will be sampled from destination-specific parameters and meta-parameters (this enables us to generate situations where more popular destinations, such as Paris, would have flights with greater passenger load than planes going to, for example, Andrèzieux-Bouthéon). Those distributions are also assumed to lower-bounded, parting from the fact that airline companies would have cancelled the flight (or remanaged planes—remember that we are looking at past events here) if it wasn't economically viable to proceed with the flight.

Once the airplane load is determined, the simulation proceeds generating passengers until their count matches the expected number of passengers for the flight. Passengers are sampled from varying groups, categories resulting from the combination of distinct counts (e.g., single, couple, one kid, two kids, three kids) and types (e.g., drop-off/pickup, parking, not parking, unrelated). Each group will then also have different parameters specifying their duration distributions.

For drop-off and pickup groups, five durations will be estimated, generating multiple parking events to accommodate this airport usage behavior:
 a) The time of arrival to the airport when dropping-off a group.
 b) The time of departure from the airport after dropping-off a group.
 c) The ideal group trip duration.
 d) The time of arrival to the airport when picking up a group.
 e) The time of departure from the airport after picking up a group.

For the parking and not parking behaviours, parking events will be generated for:
 a) The time of arrival to the airport of a group.
 b) The ideal group trip duration.
 c) The time of departure from the airport of a group.

For unrelated behaviours, parking events will be generated for:
 a) The time of arrival to the airport of a group.
 b) The parking duration.

Finally, a special word should be given detailing the unrelated group. This group reflects parking events related to airport activity (number of passengers of each flight) but that will never board the plane and that are only bounded by the simulated period and not the flight departure or arrivals. Those events, therefore, are modelled after people who go to the airport to eat, do shopping, or work.

Figure 7A:
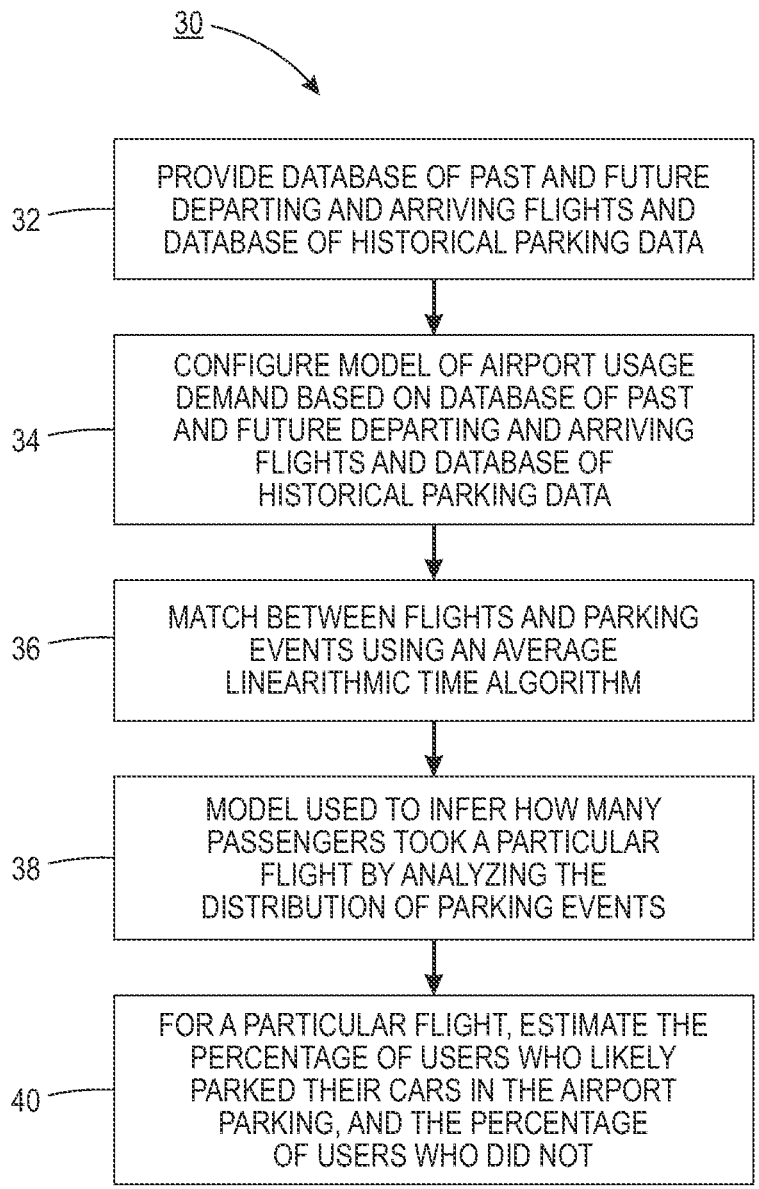
FIG. 7A illustrates a high-level flow chart of operations depicting logical operational steps of a method for modelling airport usage demand, in accordance with a preferred embodiment.

FIG. 7A illustrates a high-level flow chart of operations depicting logical operational steps of a method 30 for modelling airport usage demand, in accordance with a preferred embodiment. The method 30 can be employed to model airport usage demand based on a database of past and future departing and arriving flights from a local airport, and a database of historical parking data. As indicated at block 32, a step or operation can be implemented to configure or provide the database of past and future departing and arriving flights from a local airport, and the database of historical parking data. Next, as shown at block 34, a step or operation can be provided to generate or configure the model of airport usage demand based on the aforementioned databases (i.e., the database of past and future departing and arriving flights and the database of historical parking data). Next, as indicated at block 36, a step or operation can be implemented to perform a match between flights and parking events using a time matching algorithm.

Note that an example of such a time matching algorithm is an efficient time segment matching algorithm with linearithmic average time complexity. One characteristic of such an algorithm is that it can present (although not necessarily) linearithmic time complexity in the average case. In the example shown in FIG. 7A, reference is made simply to an average linearithmic time algorithm. Then, as illustrated at block 38, the model can be used to infer how many passengers took a particular flight by analyzing the distribution of parking events. Thereafter, as depicted at block 40, for a particular flight, it is possible to estimate the percentage of users who likely parked their cars in the airport parking and the percentage of users who did not.

Figure 7B:
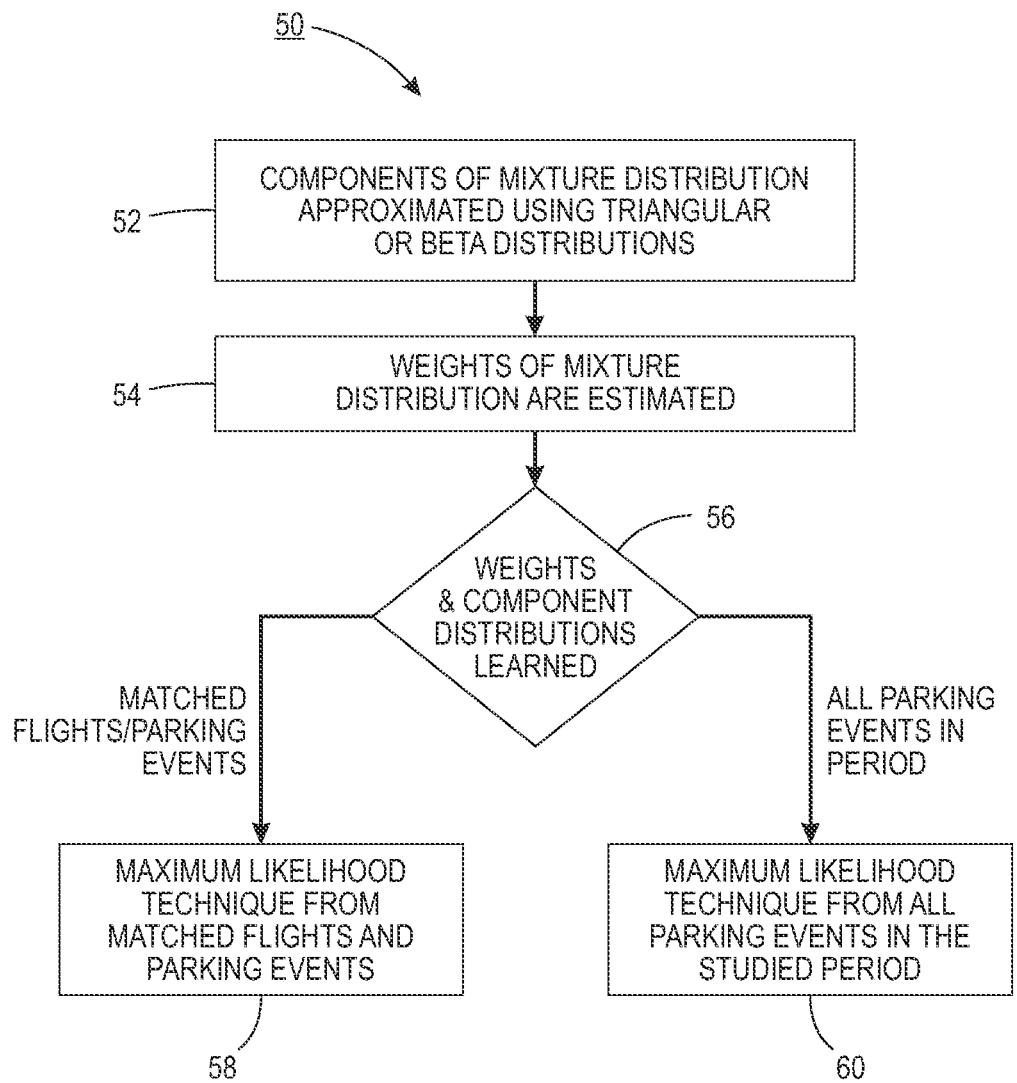
FIG. 7B illustrates a high-level flow chart of operations depicting additional logical operational steps of a method for modelling airport usage demand, in accordance with a preferred embodiment.

FIG. 7B illustrates a high-level flow chart of operations depicting additional logical operational steps of a method 50 for modelling airport usage demand, in accordance with a preferred embodiment. The method 50 shown in FIG. 7B is preferably implemented in association with the method 30 shown in FIG. 7A. As indicated at block 52, the components of the mixture distribution discussed herein can be approximated using triangular or Beta distributions. Then, as depicted at block 54, the weights of this mixture distribution can be estimated using one or more of the algorithms described herein. Both weights and the component distributions (e.g., representing flight boarding windows) can be learned using a maximum likelihood technique from the matched flights and parking events. Similarly, both the weights and the component distributions (e.g., representing flight boarding windows) can be learned using a maximum likelihood technique from all parking events in the studied period. These scenarios are represented by the operations shown at blocks 56, 58 or the operations shown at blocks 56, 60.

Note that the operations regarding the matching flights and parking events can be based in some situations on viewing the flux of passengers within an airport as a mixture distribution, wherein each component of this distribution represents a flight in the airport. Such flights can be arrivals, departures, or both. In some embodiments, the flight data can be obtained from, for example, the FlightStats data repository (e.g., FlightStats, Inc., 2014). The parking data can be derived in some embodiments, from an off-street parking lot, composed of distinct parking zones with different pricing strategies and physical characteristics, surrounding the airport. The matched data can be used to create a generative model of parking events, and in which this generative model is queried to generate new parking event samples.

Note that in some embodiments, computer program code for carrying out operations of the disclosed embodiments may be written in an object oriented programming language (e.g., Java, C#, C++, etc.). Such computer program code, however, for carrying out operations of particular embodiments can also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, 802.xx, and cellular network or the connection may be made to an external computer via most third party supported networks (e.g., through the Internet via an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 8:
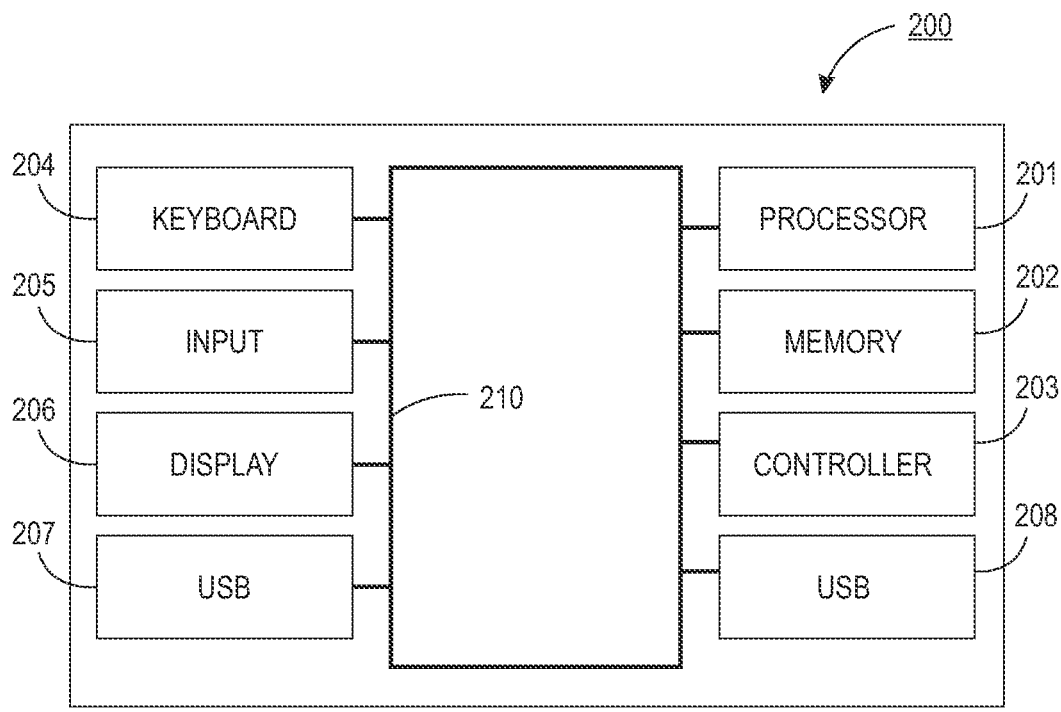
FIG. 8 illustrates a schematic view of a computer system, in accordance with an embodiment.
Figure 9:
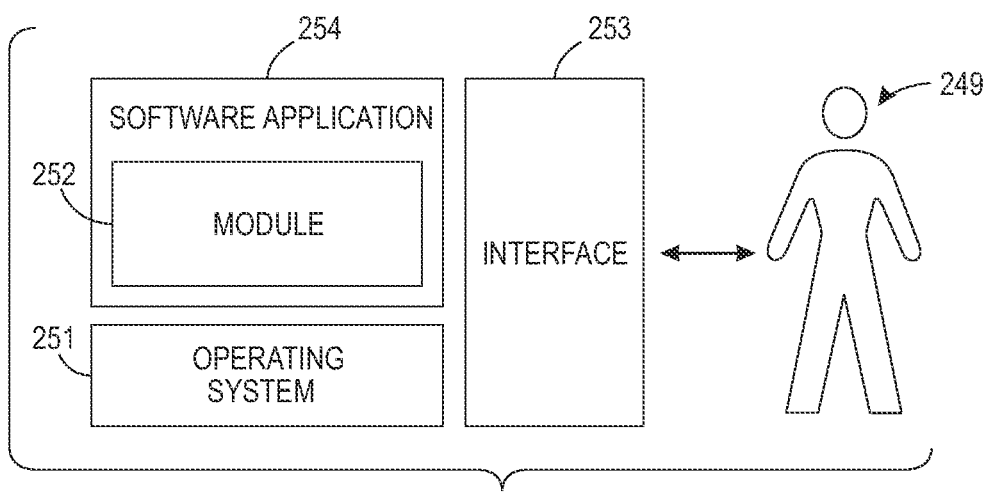
FIG. 9 illustrates a schematic view of a software system including a module, an operating system, and a user interface, in accordance with an embodiment.

FIGS. 8-9 are shown only as exemplary diagrams of data-processing environments in which embodiments may be implemented. It should be appreciated that FIGS. 8-9 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 8, some embodiments may be implemented in the context of a data-processing system 200 that can include one or more processors such as processor 201, a memory 202, a controller 203 (e.g., an input/output controller), a peripheral USB (Universal Serial Bus) connection 208, a keyboard 204 (e.g., a physical keyboard or a touchscreen graphically displayed keyboard), an input component 205 (e.g., a pointing device, such as a mouse, track ball, pen device, which may be utilized in association or with the keyboard 204, etc.), a display 206, and in some cases, mass storage 207. Data-processing system 200 may be, for example, a client computing device (e.g., a client PC, laptop, tablet computing device, etc.) which communicates with a print server (not shown) via a client-server network (e.g., wireless and/or wired). In some embodiments, the data-processing system 200 may actually be a print server that communicates with one or more printers (not shown). In some embodiments, system 10 can be modified or adopted for use as or with system 200 discussed herein.

As illustrated, the various components of data-processing system 200 can communicate electronically through a system bus 210 or similar architecture. The system bus 210 may be, for example, a subsystem that transfers data between, for example, computer components within data-processing system 200 or to and from other data-processing devices, components, computers, etc. Data-processing system 200 may be implemented as, for example, a server in a client-server based network (e.g., the Internet) or can be implemented in the context of a client and a server (i.e., where aspects are practiced on the client and the server). Data-processing system 200 may be, for example, a standalone desktop computer, a laptop computer, a Smartphone, a pad computing device, a server, and so on.

FIG. 9 illustrates a computer software system 250 for directing the operation of the data-processing system 200. Software application 254, stored, for example, in memory 202, generally includes a kernel or operating system 251 and a shell or interface 253. One or more application programs, such as software application 254, may be "loaded" (i.e., transferred from, for example, mass storage 207 or other memory location into the memory 202) for execution by the data-processing system 200. The data-processing system 200 can receive user commands and data through the interface 253; these inputs may then be acted upon by the data-processing system 200 in accordance with instructions from operating system 251 and/or software application 254. The interface 253, in some embodiments, can serve to display results, whereupon a user 249 may supply additional inputs or terminate a session.

The software application 254 can include one or more modules such as module 252, which can, for example, implement instructions or operations such as those described herein. Examples of instructions that can be implemented by module 252 include operations such as those shown and described herein with respect to blocks 32, 34, 36, 38, 40 of FIG. 7A and blocks 52, 54, 56, 58; 60 of FIG. 7B. Another example of instructions that can be implemented by module 252 include those shown and described herein with respect to the model shown in FIG. 6.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application. However, a module may also be composed of, for example, electronic and/or computer hardware or such hardware in combination with software. In some cases, a "module" can also constitute a database and/or electronic hardware and software that interacts with the database.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines: and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

FIGS. 8-9 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including, for example, Windows, Macintosh, UNIX, LINUX, and the like.

It will be appreciated that variations of the above-disclosed and other features and functions, or alternatives thereof, may be desirably combined into many other different systems or applications. It will also be appreciated, that various presently unforeseen or unanticipated alternatives, modifications, variations or improvements therein may be subsequently made by those skilled in the art, which are also intended to be encompassed by the following claims.

What is claimed is:

1. A method for estimating airport usage demand utilizing an electronic database to improve the functioning of an airport system, comprising:

compiling in an electronic database, airport parking traffic usage data and flight-time table data with respect to at least one airport, wherein said airport parking traffic usage data includes a distribution of vehicle parking events associated with said at least one airport and wherein said flight-time table data includes flight data comprising arrival flight information including a total number of arriving flights, flight arrival times, departure flight information including a total number of departing flights, flight departure times, and departure flight maximum capacities including a total number of passengers for each departing flight, said vehicle parking events associated with vehicles including cars and trucks;

analyzing said airport parking traffic usage data and said flight-time table data contained in said electronic database using a time matching approach comprising processing an efficient time matching algorithm comprising a segment matching algorithm with said flight-time table data and said traffic usage data utilizing a processor of a data-processing system that is operably connected to said electronic database, said time matching approach including performing an initial matching between parking users and potential flight passengers in linearithmic average time complexity; and estimating with a processor of a data-processing system, passenger behavior including passenger flow with respect to said at least one airport based on said airport parking traffic usage data and said flight-time table data, in response to analyzing said airport parking traffic usage data and said flight-time data contained in said electronic database, wherein said estimating includes inferring an amount of passengers that took a flight in response to analyzing said distribution of parking events, and wherein said passenger flow as said at least one airport is modeled as a mixture of components during a given time period, wherein each component among said mixture of components is associated with a departure flight and wherein said each component in said mixture is modeled as a finite interval distribution and in some cases of said mixture as triangular distributions.

2. The method of claim 1 further comprising determining an alignment of said flight data and parking data comprising said distribution of parking events in response to analyzing said airport parking traffic usage data and said flight-time table data using said time matching approach and wherein said distribution of parking events associated with said at least one airport comprises a mixture distribution with respect to said mixture of said components that is approximated using said triangular distributions or Beta distributions and wherein weights of said mixture distribution are estimated.

3. The method of claim 2 further comprising estimating said passenger behavior with respect to said at least one airport based on said alignment of said flight data and said parking data, wherein both component distributions and said weights are learned using a maximum likelihood technique from matched flights and said parking events.

4. The method of claim 2 further comprising:
deriving said parking data from at least one off-street parking lot composed of distinct parking zones with different pricing strategies and physical characteristics with respect to said at least one airport;
determining an alignment of said flight data and said parking data in response to analyzing said airport parking traffic usage data and flight-time table data using said time matching approach; and
estimating said passenger behavior with respect to said at least one airport based on said alignment of said flight data and said parking data.

5. The method of claim 3 wherein said efficient time matching algorithm comprises said segment matching algorithm with said linearithmic average time complexity in an average case.

6. A method of modeling airport usage demand to improve the functioning of an airport system, comprising:
providing an electronic database of past and future departing and arriving flights from at least one airport and an electronic database of historical parking data with respect to said at least one airport, wherein said historical parking data includes a distribution of parking events associated with said at least one airport and said past and future departing and arriving flights includes information comprising a total number of arriving flight, flight arrival times, departure flight information including a total number of departing flights, flight departure times, and departure flight maximum capacities including a total number of passengers for each departing flight;
storing said electronic database in a memory of a computer; and
generating a model of airport usage demand including passenger with respect to said at least one airport by processing information contained in said database of past and future departing and arriving flights and in said database of historical parking data and based on a processed match between said historical parking data and said past and future departing and arriving flights using a time matching approach comprising a segment matching algorithm, and wherein said passenger flow as said at least one airport is modeled via said model as a mixture of components during a given time period, wherein each component among said mixture of components is associated with a departure flight and wherein said each component in said mixture is modeled as a finite interval distribution and in some cases of said mixture as triangular distributions and wherein said time matching approach includes performing an initial matching between parking users and potential flight passengers in linearithmic average time complexity.

7. The method of claim 6 wherein said model after being processed by a processor infers how many passengers took a particular flight by analyzing a distribution of parking events with respect to said at least one airport and based on said information contained in said database of past and future departing and arriving flights and said database of historical parking data involving vehicles including cars and trucks parked at said at least one airport and at parking lots surrounding said at least one airport.

8. The method of claim 7 further comprising estimating for a particular flight with respect to said at least one airport, and based on said model, a percentage of users who likely parked said vehicles in airport parking at said at least one airport and a percentage of users who did not.

9. The method of claim 7 further comprising developing said match based on viewing a flux of passengers within said at least one airport as a mixture distribution wherein each component of said mixture distribution represents at least one flight with respect to said at least one airport and wherein said at least one flight is either an arrival, a departure, or both and wherein said mixture distribution is approximated utilizing triangular distributions or Beta distributions.

10. The method of claim 9 wherein said historical parking data is derived from an off-street parking lot composed of distinct parking zones with different pricing strategies and physical characteristics, surrounding said at least one airport.

11. The method of claim 9 wherein data associated with said match is employed to create a generative model of parking events that is queried to generate new parking event samples, wherein said model comprises a generative model.

* * * * *